(12) United States Patent
Sanford

(10) Patent No.: US 7,794,812 B2
(45) Date of Patent: Sep. 14, 2010

(54) LABEL FORM HAVING A TRANSPARENT LAMINATE

(75) Inventor: William Sanford, Prescott, WI (US)

(73) Assignee: Smead Manufacturing Company, Hastings, MN (US)

(*) Notice: Subject to any disclaimer, the term of this patent is extended or adjusted under 35 U.S.C. 154(b) by 0 days.

(21) Appl. No.: 09/981,763

(22) Filed: Oct. 17, 2001

(65) Prior Publication Data

US 2003/0072976 A1    Apr. 17, 2003

(51) Int. Cl.
  B32B 9/00 (2006.01)
  B65D 65/28 (2006.01)
  B42D 15/00 (2006.01)
  G09F 3/10 (2006.01)

(52) U.S. Cl. ............ 428/40.2; 428/41.7; 428/41.8; 428/42.1; 428/42.2; 428/42.3; 428/43; 283/81; 283/101; 283/109; 283/110; 40/638

(58) Field of Classification Search ........... 428/40.2, 428/41.7, 41.8, 42.1, 42.2, 42.3, 43; 283/81, 283/101, 109, 110; 40/638
See application file for complete search history.

(56) References Cited

U.S. PATENT DOCUMENTS

| 2,953,865 A | * | 9/1960 | Heuser .............................. 40/638 |
| 3,070,482 A |  | 12/1962 | Cunningham |
| 3,221,430 A |  | 12/1965 | Cunningham |
| 3,348,324 A |  | 10/1967 | Cunningham |
| 3,691,662 A | * | 9/1972 | Cunningham .............. 40/641 |
| 3,924,744 A | * | 12/1975 | Heimann ................... 206/460 |
| 4,050,719 A |  | 9/1977 | Cunningham .............. 283/36 |
| RE29,422 E |  | 10/1977 | Cunningham .............. 40/2 R |
| 4,445,711 A |  | 5/1984 | Cunningham .............. 283/1 R |
| 4,951,970 A | * | 8/1990 | Burt ............................ 283/81 |
| 5,873,607 A | * | 2/1999 | Waggoner ................... 283/81 |
| 5,902,440 A |  | 5/1999 | Jenkins |
| 6,385,860 B1 | * | 5/2002 | MacWilliams et al. ....... 33/613 |
| 6,685,228 B2 | * | 2/2004 | Riley ......................... 283/109 |

FOREIGN PATENT DOCUMENTS

EP    1129866 A2 *   9/2001

* cited by examiner

Primary Examiner—Victor S Chang
(74) Attorney, Agent, or Firm—Altera Law Group, LLC

(57) ABSTRACT

A label form which includes a backing member having a label member removably attached to the backing member and a transparent laminate removably attached to the backing member. The backing member can include a split-line crack for allowing the label member and the transparent laminate to be aligned and attached to a stock member. The transparent laminate can be located on the backing member so as not to cover the label member, wherein the label member includes an exposed surface for printing on the label member.

14 Claims, 3 Drawing Sheets

LABEL FORM HAVING A TRANSPARENT LAMINATE

FIELD OF THE INVENTION

This invention relates to the field of labels, and more specifically to labels for applying to file folders, folder tabs, and other stock members.

BACKGROUND

In many document filing systems, labels are applied to file folders so that the label is located along an edge of one of the folder tabs. The labels are readily visible when the file folders are stored in cabinets or on shelves.

However, sometimes the label becomes torn or disfigured from being handled or being pushed around on the shelf. Providing and applying a transparent laminate to cover and protect the label is problematic since the person who applies the transparent laminate must try to align it as they are putting it on. Moreover, it is a timely process to prepare and apply the transparent laminate, especially when hundreds or thousands of labeled folders must be prepared and filed. For such a system to work efficiently, the labels and any laminates must be applied quickly and easily. Moreover, in some situations the labels are printed by the end-user shortly before being applied to the folder. This does not allow a transparent laminate to be pre-applied to the label surface by the manufacturer.

SUMMARY

In light of these and other needs, the present invention provides a label form having a transparent laminate. In one embodiment, a label form includes a backing member, a label section removably attached to a first side of the backing member, and a transparent laminate removably attached to a second side of the backing member. This allows the label to be printed, applied, and then covered by a pre-cut, handy, transparent laminate. In one option, the transparent laminate is cut to be slightly larger than the label. In one option, the backing member includes a first section and a second section separated by a split-line and the label member and the transparent laminate each straddle the split-line. This allows the label section and the transparent laminate adhere to different sections of the backing member when the backing member is separated along the split-line. This allows the label and then the transparent film to be aligned on a folder before being applied.

DESCRIPTION

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

The description herein will discuss a novel label form and methods of use. However, it is to be understood that the discussion is merely exemplary and is not meant to limit the invention to labels for document storage file folders and the like, and that many other uses and applications are within the scope of the present invention.

Figure 1:
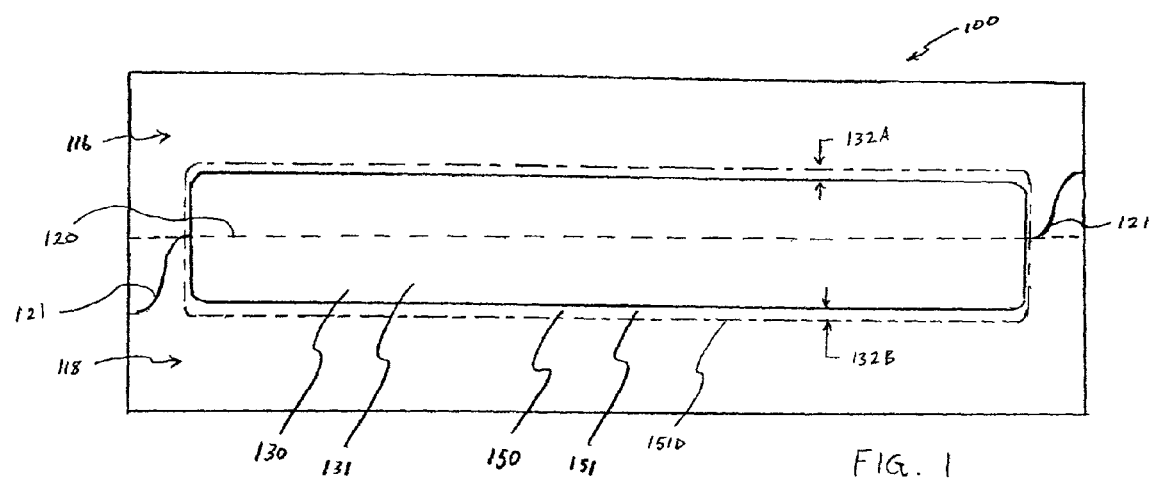
FIG. 1 shows a top view of a label form according to one embodiment.
Figure 2:
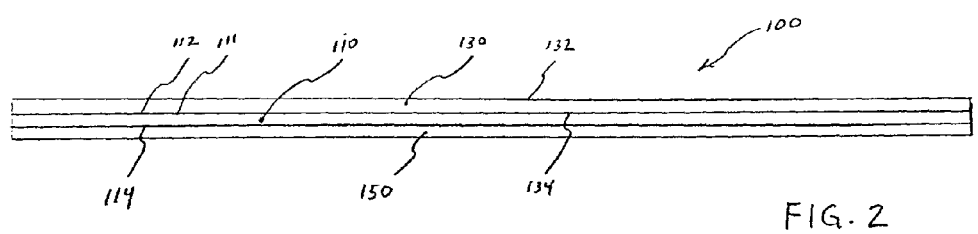
FIG. 2 is a side view of the label form of FIG. 1.

FIGS. 1 and 2 show a top view and side view respectively of a label form 100 according to one embodiment. Label form 100 includes a backing member 110 sandwiched between a label substrate section 130 and a transparent film laminate 150.

Backing member 110 includes a first surface 112 and a second surface 114 opposite the first surface. In one embodiment, backing member includes a release coating 111 on both surfaces 112 and 114. In one embodiment, backing member 110 includes a first section 116 and a second section 118 which are separated by a split-line 120 therebetween. Split-line 120 can extend all the way across the backing member or it can extend only partially across. In some embodiments, split-line 120 runs straight across the label form. Alternatively, split-line 120 can follow the contours of a shaped edge 121. Split-line 120 can be a full die-cut, a series of perforations, or other equivalents. Some embodiments omit split-line 120.

In one embodiment, label section 130 includes a die-cut label member 131 which straddles or lays across the split-line 120. When backing member 110 is split into the two sections 116 and 118, the label member 131 adheres to one of the sections while laminate 150 adheres to the other section. A shaped edge, such as edge 121, can be used for aligning the label upon a folder, for example. In some embodiments, a second shaped edge is located on each side of the label in a symmetrical configuration. Other permutations having fewer or more shaped edges are within the scope of the present label system. Further examples of such a structure are discussed in co-pending and co-assigned U.S. patent application Ser. No. 09/516,683, filed Mar. 1, 2000, and entitled Label and Method for Applying, which is incorporated herein by reference in its entirety.

Label section 130 is removably attached to first side surface 112 of backing member 110. Label section 130 includes a top surface 132 which is adapted for being printed on. For instance, the surface can be adapted for being printed on by a printer such as an inkjet or laser-jet printer. In one embodiment, label 131 is a preprinted label. Label section includes a second side 134 having an adhesive such as a pressure-sensitive adhesive thereon and removably attached to one side of backing member 110.

Label section 130 is cut to provide one or more label members, such as label member 131. In one embodiment, label form 100 is a piggyback label form in which label member 131 is the only part of the label section attached to backing sheet 110. In the exemplary embodiment, label form 100 has dimensions of approximately 4.125 inches by 9.5 inches. This provides a standard size for using the label form in a standard printer. Alternatively, the label form can be other sizes, depending on the type of printer being used or on the size of label needed.

Transparent film laminate 150 is removably attached to second side surface 114 of the backing member. Laminate is located on the second side 114 of backing member 110 so that the laminate does not interfere with the printing of label 131 while still being handy to allow a user to apply both the label and the laminate from a single label form. Film laminate 150 includes an adhesive such as a pressure-sensitive adhesive on one side of the transparent film.

In this example, transparent laminate 150 also straddles split-line 120. In one embodiment, laminate 150 can cover the whole side of backing member 110, and have a die-cut portion 151 as indicated by dotted line 151D in FIG. 1. In another embodiment, only portion 151 is provided in a piggy-back configuration. Thus, when the backing member is separated along split-line 120, the label section 131 adheres to one section of the backing member and the transparent film laminate 151 adheres to the other section of the backing member. Transparent laminate 150 can be a clear plastic, a polystyrene, a partially or completely transparent film. Transparent laminate 150 is removable from backing member 113 in the same manner as label section 130 is removed. Accordingly, laminate 150 can be aligned on a folder using alignment features, such as edges 121, on portions of the label form 100.

In one embodiment, laminate 150 is slightly larger than label member 131. This allows the laminate 150 to skirt label member 131 when the label member has been applied to a folder. This means the laminate completely covers and goes slightly over the edges of the label to adhere to the folder itself. In one example, laminate 150 is approximately ¼" wider than label member 131 and there is an approximately ⅛" size difference 132A and 132B on each side of the label.

Figure 3:
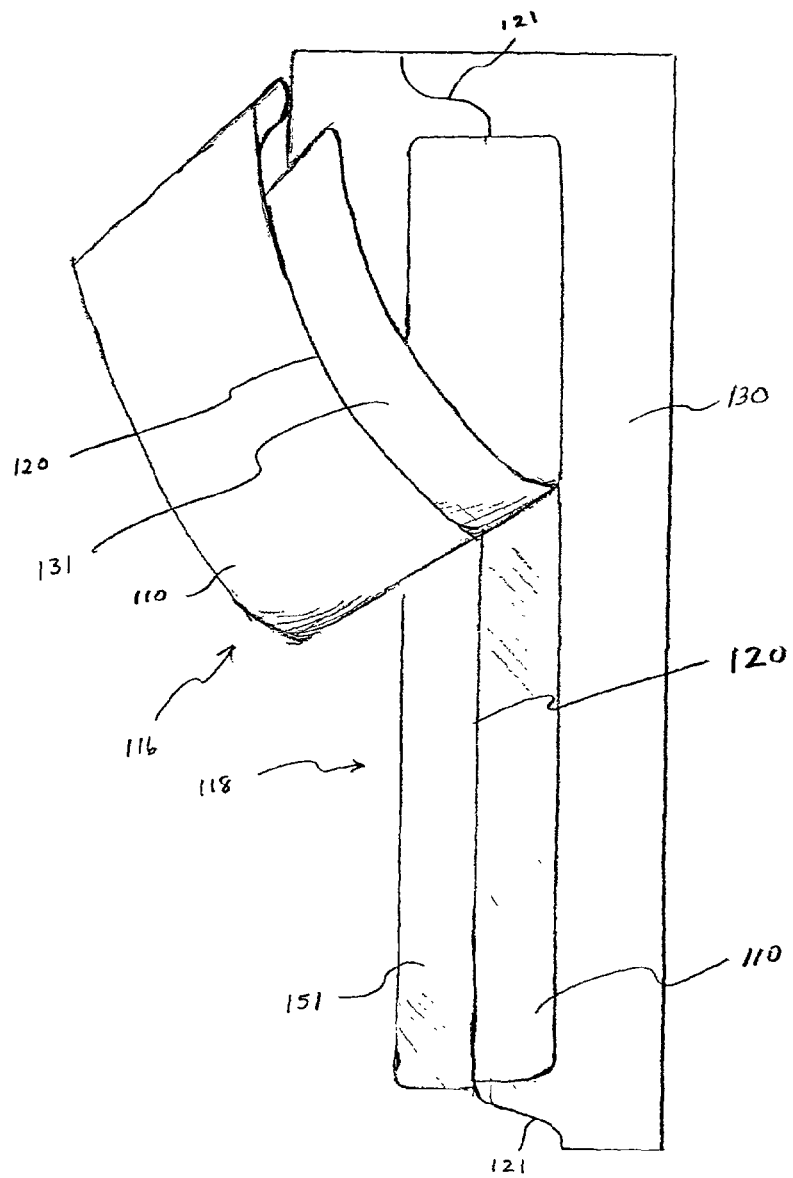
FIG. 3 is an isometric view showing the label of FIG. 1 being peeled.

FIG. 3 is an isometric view showing the label 100 of FIG. 1 being peeled apart along split-line 120. In this example, label member 131 adheres to the first section 116 of backing member 110 when the two halves of the label form are peeled apart while laminate 151 adheres to the second section 118. In this example, approximately half of each of the label 131 and laminate 151 is exposed beyond the split-line 120. Other proportions are within the scope of the present example.

Figure 4:
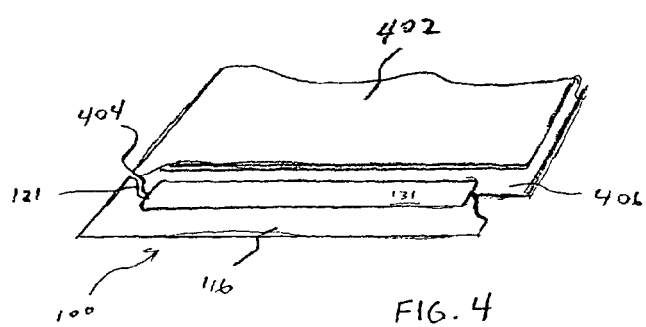
FIG. 4 shows the label of FIG. 1 being applied to a folder.

FIG. 4 shows an example of label 131 being applied to a folder 402. First section 116, along with label member 131, has been separated from second section 118 and laminate member 151. Shaped edge 121 matches with the edge 404 of folder 402 to allow the label to be aligned. To apply label member 131, a first half portion of label member 131 is applied to the front of a tab 406. Then the first section 116 of the backing member is peeled away from label member 131 and the label member 131 is folded over the edge of tab 406 and the other half of the label is applied to the other side of the tab. Alternatively, depending on the folder tab design, the present method can be employed to apply a label member onto a flat surface.

In a similar manner, laminate 151 is then placed upon label 131. Thus, second section 118 with laminate 151 attached thereto is aligned with edge 404 of the folder using second edge 121, in the same manner as shown in FIG. 4. The laminate is first applied to one side of the folder tab and then folded over the edge of the tab and applied to the second side, thereby covering and skirting the label. One advantage of the present embodiment is that backing member 110 supports the clear laminate as it is being applied to a stock member. This keeps the laminate member from curling as it would if it was free and only held in a user's hands. Moreover, edges 121 allow both the label member and the laminate to be consistently and quickly aligned and placed on the folder tab.

Figure 5:
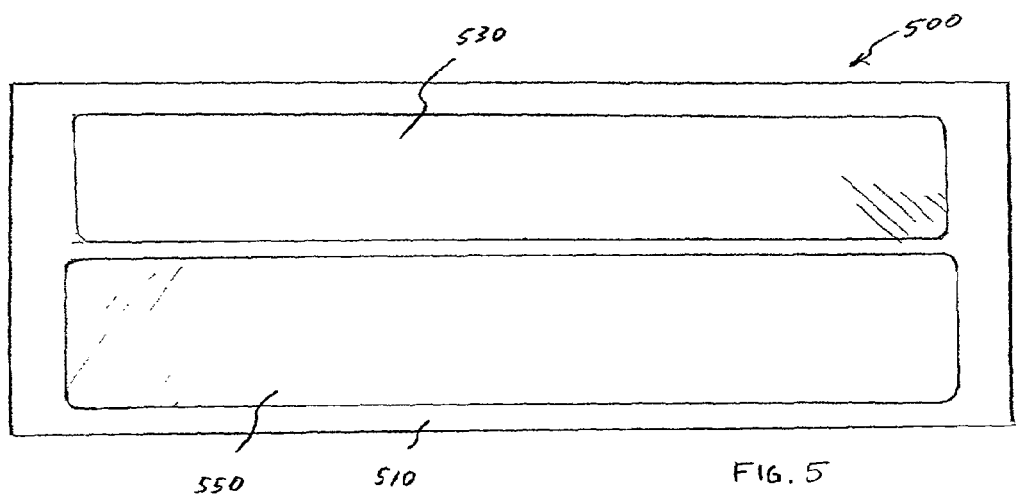
FIG. 5 shows a top view of a label form according to one embodiment.

FIG. 5 shows a top view of a label form 500 according to one embodiment. Label form 500 includes a backing member 510, a label member 530, and a laminate member 550 which are similar to the members discussed above for label form 100. In this example, clear laminate member 150 is located on the same side of the backing member as label member 530 and is located so that the label member includes an exposed surface for printing. In this example, label 550 can be printed using a printer without laminate 550 interfering with the printing process. Then the label and the laminate can be sequentially placed upon a folder or other stock member. Some embodiments include one or more split-lines as described above for label form 100.

Figure 6:
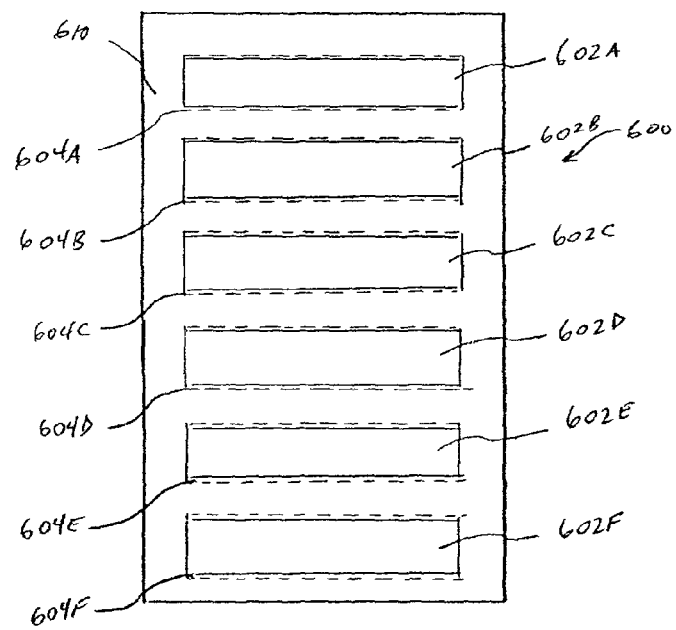
FIG. 6 shows a top view of a label form according to one embodiment.

FIG. 6 shows a top view of a label form 600 according to another embodiment. Label form 600 includes a backing member 610 having a series of label members 602A-602F on one side of the backing member. Each label member 602A-602F includes a corresponding clear laminate member 604A-604F on the opposing side of backing member 610, as indicated by the dashed lines in the Figure. One embodiment includes split-lines as described above for label form 100 under each of labels 602A-602F.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An alignable label system for two dimensional alignment with a folder having a first linear edge and a second edge each having a curvature, comprising:
   a label sheet having a central split line, said label sheet having a line separating a label from a second portion;
   a backing member applied to the label and having a split line;
   an alignment section on each portion being separable from the label, and including an edge shaped generally to conform to the curved edge of the folder;
   wherein when one portion of the backing member is removed, one half of the label is exposed along with the curved edge so that the label may be maintained in alignment with the folder by engagement of the curved section of the second part with the curved edge of the folder, while the exposed side of the label is affixed to the folder.

2. The label form of claim 1, wherein each curved edge is proximate ends of the label.

3. A method of aligning and applying a label to the edge of a folder, the folder having a linear edge and a curved edge, the label being removably affixed to a label backing sheet and also having a pair of separable alignment section on opposite sides of a split line in the label comprising:
   selecting which alignment section of the label will be aligned with the folder,
   a. removing a portion of the backing member from that portion of the label by separating the backing sheet along a split line;
   b. aligning the linear and curved edges of the alignment section to like edges of the folder;
   c. applying the label to the folder;
   d. peeling off the remaining backing member along the split line; and
   e. folding the label over the edge of the folder.

4. The method of claim 3, wherein the label includes a top side adapted for being printed on.

5. The method of claim 3, wherein the curved edge is "S"-shaped.

6. The label form of claim 1, wherein the curved edge is "S"-shaped.

7. A label system for alignment of a label on a folder before affixation, the folder having a linear edge and a curved edge, the system comprising:

a. a label sheet having a base backing member with a split line,
b. a label on said backing member;
c. a second portion on said backing member, said label sheet having a line separating the label from the second portion;
d. an alignment section on said first and second portions shaped to generally to conform to the curved edge of the folder;

so that, when a portion of the backing member is removed, at least part of the label and second portion are exposed and positionable along the linear and curved edges, so that the label may be reliably maintained in registration with linear and curved edges of the folder before it is affixed to the folder.

8. The system of claim 7 wherein said curved portion is spaced from said label, so that said label may be affixed to the folder distant from the curved portion of thereof.

9. The system of claim 7 wherein said label is adhesive on the surface contacting the backing member.

10. The system of claim 7, wherein said label sheet includes a plurality of labels and second portions, with die cut lines therebetween.

11. The system of claim 7 wherein said die cut separates the second portion into first and second parts, and wherein the label split line, at least in part, follows a curve which is substantially the same as the folder's curved edge.

12. The method claim 3 wherein the step of removing a portion of the backing member from the label by separating the backing sheet along a split line includes removing a portion of the second portion together with the backing member from the label by separating the backing sheet along a split line.

13. In a label system for alignment of a label on a folder before affixation, the folder having a linear edge and a non-linear edge, a label sheet having backing member with a split line, a label on said backing member; a second portion on said backing member, said label sheet having a line separating the label from the second portion; the improvement comprising:

an alignment section on each of said portions shaped to generally to conform to the curved edge of the folder;

so that, when a portion of the backing member is removed, at least part of the label and second portion are exposed and positionable along the linear and curved edges, so that the label may be reliably maintained in registration with linear and curved edges of the folder before it is affixed to the folder.

14. The system of claim 13 wherein said label has first and second ends and wherein said curved portions are located on opposite sides of said split line and on opposite ends thereof.

* * * * *